UNITED STATES PATENT OFFICE.

ENOCH OSGOOD, OF BOSTON, MASSACHUSETTS, ASSIGNOR, BY MESNE ASSIGNMENTS, TO ELLIOTT P. GLEASON, OF NEW YORK CITY.

IMPROVEMENT IN PROCESSES FOR RENDERING LEATHER AND OTHER FIBROUS SUBSTANCES SOFT AND FLEXIBLE AND IMPERVIOUS TO GAS, AND COMPOSITION FOR SAME.

Specification forming part of Letters Patent No. 129,901, dated July 30, 1872; Reissue No. 8,186, dated April 16, 1878; application filed October 23, 1877.

*To all whom it may concern:*

Be it known that I, ENOCH OSGOOD, of Boston, in the Commonwealth of Massachusetts, have invented a new and useful Process of rendering leather, skins, and other fibrous and porous substances flexible, pliable, and impervious to gas, for use in gas tubes, bags, meters, regulators, and other analogous uses, of which the following is a specification:

My invention consists in treating or saturating the leather, skin, cloth, or other article to be rendered pliable and gas-tight with glycerine.

The article to be prepared by my process is saturated by immersion in glycerine, with or without the aid of heat; or the glycerine may be rubbed in, or be applied by thorough brushing, or otherwise. The substances to be rendered pliable and impervious may or may not be first wrought into the desired form before being treated with glycerine.

My invention is of especial value in preparing the diaphragms of gas meters and regulators, in which the constant movement of the diaphragm is such that flexibility, pliability, and freedom from dryness or hardness are of the first importance. I have discovered that glycerine imparts these qualities to a great degree, and at the same time greatly adds to its impermeability to gas.

When the glycerine is used on skins, leather, or other porous or fibrous materials in gas tubes, bags, or other vessels, it gives to them a greater degree of pliability, freedom from dryness, and imperviousness to gas and other fluids analogous to illuminating-gas than has yet been attained.

In case of injury by absorption or abrasion, the injured part may be repaired and rendered gas-proof and pliable by recharging the injured part or the whole article with glycerine.

Having thus described my invention, what I claim as new, and desire to secure by Letters Patent, is—

1. As a new article of manufacture, leather or skin, or their equivalent, saturated with glycerine, whereby said article is rendered impervious to gas and soft and flexible, substantially as described.

2. The herein-described process of rendering diaphragms, tubes, and vessels of leather, skin, or other fibrous and porous material impervious to gas, soft and flexible, by saturating or treating the same with glycerine, substantially as set forth.

ENOCH OSGOOD.

Witnesses:

FRANK N. MUDGE,

G. S. AUSTIN.